United States Patent [19]

Brewster

[11] 4,092,818

[45] June 6, 1978

[54] HAY BALER

[76] Inventor: Donald H. Brewster, 2630 Creek Rd., Sandy, Utah 84070

[21] Appl. No.: 658,239

[22] Filed: Feb. 17, 1976

[51] Int. Cl.² .............................................. A01D 39/00
[52] U.S. Cl. ........................................ 56/341; 100/87
[58] Field of Search ..................... 56/341, 343; 100/76, 100/88, 5, 87

[56] References Cited

U.S. PATENT DOCUMENTS

| 510,385 | 12/1893 | Graves | 100/87 |
| 972,884 | 10/1910 | Luebben | 56/341 X |
| 1,027,393 | 5/1912 | Brown | 100/87 |
| 2,581,542 | 1/1952 | Kolzing | 56/341 |

Primary Examiner—Jay N. Eskovitz
Attorney, Agent, or Firm—Trask & Britt

[57] ABSTRACT

A hay baler capable of forming large cylindrical bales of hay utilizing a single continuous belt is disclosed. The baler has forks for picking up loose hay from the ground and transporting the hay to an elevated position to be gravity fed to a baling section. A loop of a single endless belt, or parallel endless belts spaced to perform the same function as a single belt, forms a baling section. The large loop of a single belt rolls the hay into a cylindrical bale. The baler generally propells the belt from a power take off from a tractor or from the wheels of the baler and discharges the bale from the rear of the baler.

8 Claims, 4 Drawing Figures

HAY BALER

BACKGROUND OF INVENTION

1. Field

The invention relates to machines for baling hay by being self-propelled or towed behind a tractor to pick up loose hay from the ground and roll it into a large, compacted cylindrical bale weighing from 500 pounds to several thousand pounds.

2. Prior Art

Balers to form loose hay into cylindrical bales have been utilized for some time. One of the early machines of this purpose used at least a pair of endless belts to interact with one another to draw the hay into a baling section and to make relatively small cylindrical bales, that is, bales weighing less than 200 pounds. More recently, balers using a plurality of belts have been utilized to make very large cylindrical bales by picking up loose hay, moving it into a baling section wherein there are at least a pair of belts, one a horizontal feed belt moving in one direction and the second a baling or pressure belt moving in an opposite direction and generally above the first belt and disposed at an angle to the first belt so that the hay is fed into the section where the two belts are close together and the hay is rolled. As the roll begins to grow the hay moves forward on the feed belt to a point where the feed and the baling belt are farther apart. Also, in some embodiments the pressure belt has surplus length, but is under tension so as the bale grows the feed belt is capable of taking up the surplus to permit the bale to expand but to maintain pressure with the bale and continue to roll the bale until it has reached its maximum growth. In one embodiment of this type of device, the bale is discharged by hydraulically lifting the frame work which suppots the second or baling belt so that the bale may be discharged at the rear of the baler.

OBJECTS OF THE INVENTION

It is an object of the invention to provide a hay baler to form a compacted cylindrical bale of hay through the use of a single continuous belt.

A principal object of the instant invention is to provide a baler with a positive baling action and increased capacity.

A further object of the invention is to provide a hay baler having a simplified discharge means for large cylindrical bales.

A further object of the invention is to provide a hay baler having a looped baling section to preclude loss of hay.

DESCRIPTION OF INVENTION

A hay baler having a single loop of a continuous belt or parallel segmented belts for forming large cylindrical rolls of hay has been invented. The baler has a fork means for picking up loose hay and passing it onto a continuous belt which is inclined upwardly to carry the hay to an elevated position where it discharges by gravity feed into the hay baling section. The hay baling section is a loop or bight of a single belt and is generally the same belt which carries the hay to an elevated position. Multiple parallel belts may be utilized, but a solid single belt is greatly preferred to prevent loss of hay and to preclude belt shifting and tangling. The belt loop depends from a pair of elevated rollers. The travel of the belt causes the hay to roll into a cylindrical bale. The confining loop, which contacts the hay for about three-fourths the circumference of the bale being initiated, and effect of gravity which causes the hay to fold over, gives a unique, posiive baling action. The size of the belt loop increases as the size of the bale increases and tensioning devices may be provided so that the belt does not have loose slack in it even during the initial formation of the bale. The hanging loop exerts lateral pressure as the bale grows, thus compacting the bale.

The elevated rollers from which the belt loop depends, may be in the same plane of elevation or in slightly different planes of elevation, although generaly the forward roller is in the same plane of elevation or slightly lower than the rear roller. The rear roller is attached to support means which may be pivoted to the rear to lie flat with the main body of the baler so that the large bale may be discharged to the rear. Means for propelling the belt may be independent of the drive of the baler, e.g., driven by a power take-off from the tractor or it may be driven by the wheels of the baler. Since the bale is generally wrapped with twine before being discharged, it is preferred to have a drive which is independent of baler movement. If desired, a second continuous belt may be utilized which is in contact with the feed section of the main belt to assist in feeding hay to the elevated position at the first or forward elevated roller. Also, a large idler roller may be in contact with the first elevated roller (the drive roller) to compress or compact the hay just before it gravity discharges into the hay baling section and to increase friction between the feed belt and the drive roller.

The invention may be further understood by reference to the accompanying drawings.

Figure 1:
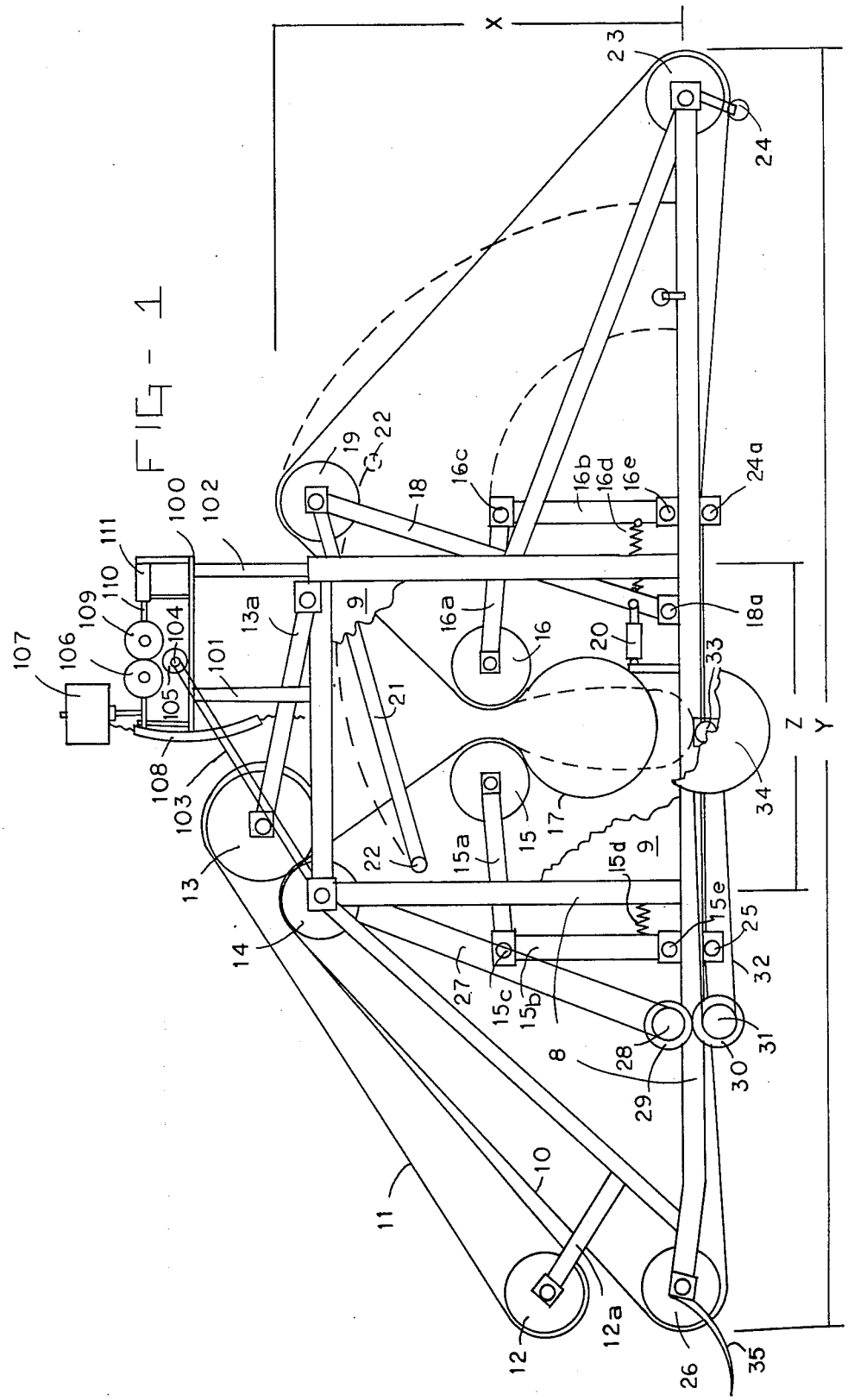
FIG. 1 is an elevational view of the side view of the baler.

FIG. 1 is an elevational view from the side of the baler. A frame means 8 is provided which supports the continuous belt 10 which is shown at the forward section of the baler in contact with the second continuous belt 11 to assist in feeding the hay upwardly to an elevated position. An enclosing panel 9 is provided on each side of the baling section to prevent loss of hay from the sides of the belt loop. The second continuous belt is supported by an idler pulley 12 which is attached to the frame by support 12a. The compacting belt 11 passes over roller 14 and about idler roller 13 which is attached to the top of the frame by support 13a. Idler roller 13 is a large heavy roller which is free to rest against upper forward roller 14 (the drive roller) to compact the hay immediately before it discharges into the hay baling section. The large idler roller 13 also assists in providing friction between belt 10 and the drive roller. Idler roller 13 may be connected to the frame along side roller 14 by spring tensioning means so that a lighter roller 13 may be utilized or more compaction provided. As indicated hereinbefore, the second belt 11 is optional and so long as the elevational angle of belt 10 is less than the angle of respose of the hay, a second belt is unnecessary.

The belt 10 travels down into the baling section past roller 15 which is hinged at two points and is maintained in position by its weight and spring member 15d which tends to give compacting force on the bale as it is rolled. Roller 15 is held in place by arms 15a and 15b which are hinged at point 15c and further hinged at connection of arm 15b with the frame at point 15e. The upright arm 15b is spring-loaded so that it requires a force from the belt to force the roller 15b outwardly away from the bale. The outward force of the belt is provided by the increasing size of the bale, thus roller 15 tends to compact the bale as the bale grows. The same construction or arrangement is true of roller 16 so that the two rollers act in concert to provide tension on the belt and to provide compaction force on the bale as it is being rolled. Roller 16 is attached to movable arm 18 by spring 16d so that the whole assembly supporting roller 16 can be lowered to allow the bale to discharge to the rear. Also, rollers 15 and 16 tend to maintain a small loop so that the bale can be initiated easily. The growing bale forces rollers 15 and 16 upward and outward, the bale being compacted in the process. Rollers 15 and 16 also prevent the free hanging belt loop from whipping or becoming twisted during the initial stages of bale formation.

Generally, arm 15a is hinged to arm 15b so that an included angle of at least 90° is maintained between them. The baling section 17 is formed by a loop in the belt which preferably hangs free. The belt is shown in dotted form is in loose form before the hay is fed therein. The belt then travels up past roller 16 and over idler roller 19 which is held in position by arm 18 which is held in position by hydraulic cylinder 20. Arm 16b is connected to arm 18 through spring-loaded means so that when the hydraulic cylinder 20 is activated to cause arm 18 to pivot about point 18a to lie flat on the frame the roller 16 is also pushed backwards so that it also lies flat on the frame and permits the bale of hay to discharge. Arm 18 may have attached thereto arm 2 which comprises a pair of arms, one on each side of the belt, with a bar 22 extending between arms 21 and behind the belt 10 as it goes into the baling section so that as roller 19 and arm 18 are pushed to the rear by hydraulic cylinder 20, the bar 22 moves to the rear and contacts belt 10 to place a force thereon to dislodge the bale from the baling position and to roll the bale to the rear with bar 22 eventually assuming the position as shown in the dotted lines slightly to the rear of the usual position of arm 18.

The belt travels from roller 19 down over idler pulley 23 which is preferably placed at a lower position than the baling section so that the bale will roll to the rear to discharge easily, although the entire baler may be constructed so that the front of the baler may be tilted to discharge the bale from the baling section. The belt then continues forward and is preferably held in close contact with idler roller 23 by small roller 24 which is to place a slight tension on the belt so that the weight of the belt extending across the bottom of the frame will not cause the loop section to move upwards. The belt preferably moves along the underneath side of the frame over bar supports 24a and 25 before proceeding to pass about roller 26 at the feed end of the baler.

Roller 14 is driven by a chain drive 27 which is driven by a sprocket 28 which is axially attached to a gear 29 which is driven by gear 30 to turn as axially connected to a sprocket 31 which is connected to a chain drive 32 to sprocket 33 on wheel 34 so that the power roller is driven by the wheels of the baler. The driving of sprocket 28 is preferably accomplished by a power take-off from the tractor since it is desired to drive the belt even when the baler is stationary, such as when the bale is turned to wind twine about the finished bale.

The dimensions X, Y and Z shown on FIG. 1 are indicative of the relationship of the baler dimensions. The spacing between rollers 14 and 19, that is Z, is generally slightly less than the maximum dimension of the roll being formed, which is generaly from about three feet to about five feet. Also, the spacing of rollers 14 and 19 some distance apart permits rollers 15 and 16 to take up slack in the belt in a better fashion than if rollers 14 and 19 were closely adjacent. The dimension X or height of the unit from the bottom of the baling section is substantially greater than the width of a bale to be formed. In a typical unit the spacing between rollers 14 and 19 is about three feet while the height of the rollers above the bottom of the baling section is about seven to eight feet. The length of the unit Y may be substantially any length, although its length will generally be sufficient to permit belt 10 to have a small angle of elevation at the feed end and to permit arm 18 to fold against the rear frame.

The angle of the belt between rollers 26 and 14 is preferably as shallow as possible consistent with a convenient length of the baler. If a steep angle, e.g., in excess of 35° is utilized, then the use of a roller chain instead of a solid belt increases hay feeding efficiency. The more shallow the angle of elevation of the belt between rollers 26 and 14 then the more easily the hay is fed to the feed section and the requirement of a second endless belt, such as belt 11, can be entirely dispensed with.

A significant feature of the single belt baling section is that the belt and weight of the bale impose a self-compacting system. It is desired to have the belt contact as much of the bale as possible to initiate the "balling" of the hay to form the bale and to compact the bale as it grows. Thus, the suspension of the belt loop from two elevated rollers spaced apart a distance less than the diameter of a finished bale provides a system whereby a pair of weighed, movable opposed rollers may pinch the belt in close adjacency to form a small loop as the bale is started, said weighted rollers moving outwardly as the bale expands so that maximum belt contact is maintained. Once the bale has grown to a diameter equal to the spacing between the elevated rollers, further growth of the bale causes increased belt contact.

A further significant feature of the balers of this invention and particularly of the embodiment illustrated in FIG. 1 is that the baler can operate at higher capacities than conventional cylindrical bale balers. The belt loop forms a positive baling action; the hay must stay in the loop and the loop is continuous, thus, there are no spaces for the hay to escape, as exists as the function of the two spaced belts in previous two-belt cylindrical balers. The positive rolling action permits increased belt speed which permits faster over-the-ground travel and a faster baling operation. Furthermore, the free-hanging belt loop is self-compensating and can better handle lumpy hay.

A twine feeding mechanism is further illustrated in FIG. 1, located above and slightly to the rear of idler 13 so as to feed twine into the baling section after a bale has been completely formed. A platform 100 is supported by stanchions 101 and 102 attached to the frame of the baler. A drive chain 103 from the drive roller 14 drives a small gear 104 which axially drives a small spur gear 105. Gear 106 is connected to an elongated screw whch transports the twine 107 and twine feeding trough 108 transversely above the baling section. Gear 109 is in contact with gear 106 and both are attached to a sliding frame 110 which is reciprocated by hydraulic cylinder 111. The sliding frame has three positions; neutral, wherein the spur gear contacts neither gear 106 or gear 109; a forward position wherein the spur gear contacts gear 106 and a reverse gear wherein it contacts gear 109. The neutral position may be controlled manually or automatically. The forward and reverse positions are automatically controlled by limit switches at each end of the screw which interconnect with solenoid hydraulic valves to activate the two-way hydraulic cylinder to either a forward or reverse position. As the twine feed trough laterally traverses the baling section, twine is fed therethrough so that the twine end contacts the bale, is drawn between the bale and the belt loop to encircle the bale and continuously wrap the bale as it is further rotated. After the bale is securely wrapped, the twine may be cut by hand or autmotically cut.

Figure 2:
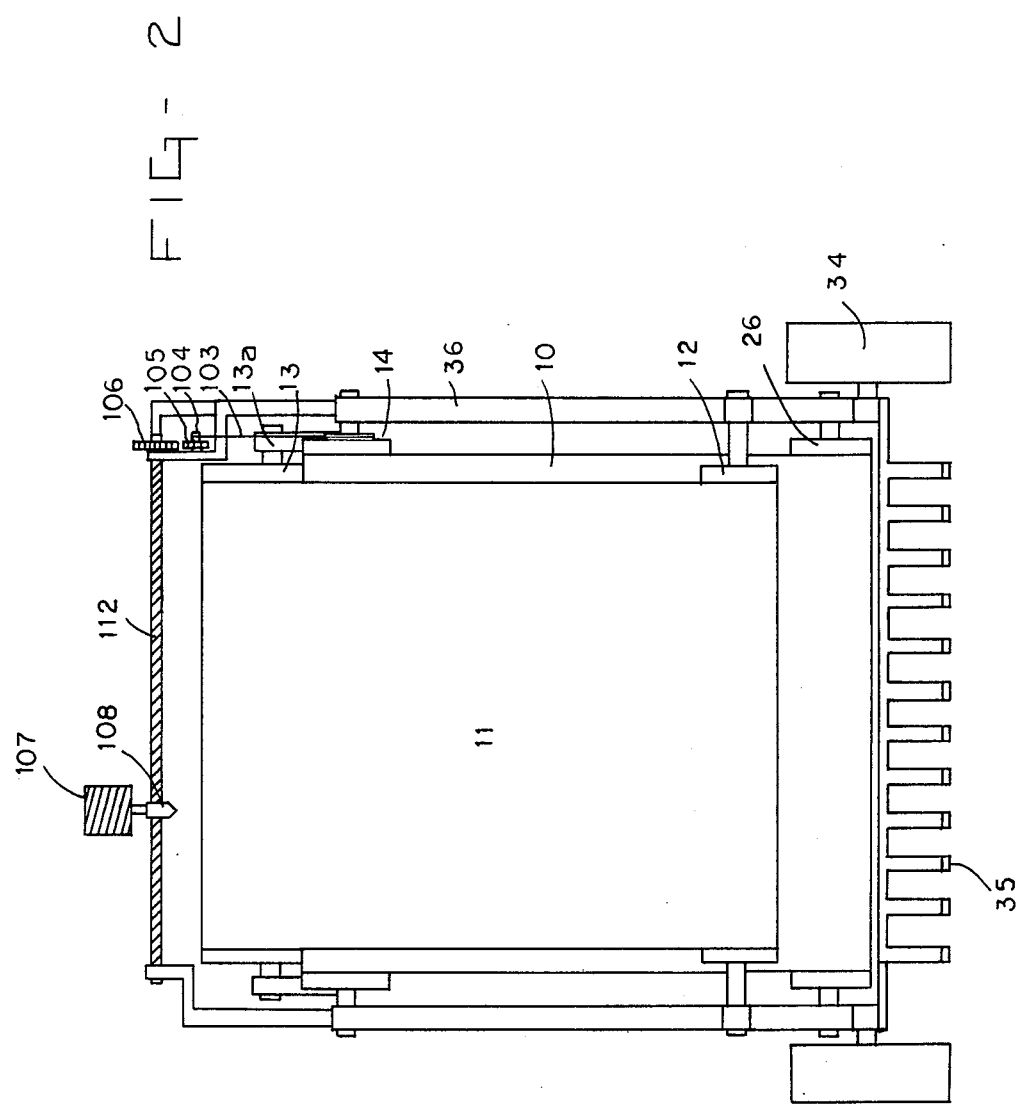
FIG. 2 is an elevational front view of the baler of FIG. 1.

FIG. 2 is an elevational front view of the baler illustrated in FIG. 1. The tines 35 are located forward of the baler and in position to scoop hay upon the tines as the baler moves forward, causing the hay to ride to the rear and pass onto belt 10 which carries it to the baling section. Belt 11 is illustrated in contact with belt 10, although as indicated hereinbefore, the use of belt 11 is optional dependent upon the angle of elevational of belt 10. Roller 13 is shown in a superior position to roller 14 and is suspended by arm 13a from vertical frame and panel 9. As heretofore indicated, panel 9 preferably encloses each side of the belt in the baling section within about two inches so that hay cannot be lost from the edges of the belt.

In FIG. 2 the twine feeding apparatus is shown above roll 13. The screw 112 traverses the width of the belt 10 causing the twine feed trough 108 to reciprocate across the width of the baling section. The ball of twin 107 is supported on the feed trough and travels with it. Drive chain 103 connects the speed gear 105 through sprocket 104 with drive roller 14.

Limit switches located at each of the screws reverse the direction of screw 112 by activating solenoid vales which control the flow of hydraulic fluid to cylinder 111. The neutral position of gear 105 may be controlled by the operator so that twine is fed into the baling section only on demand.

Figure 3:
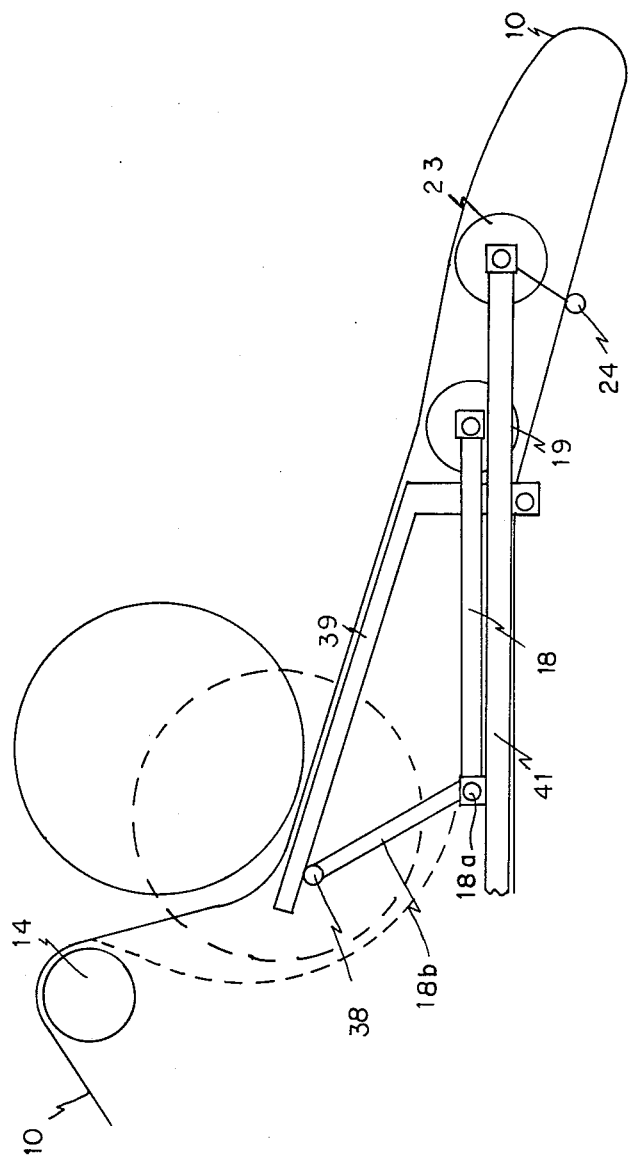
FIG. 3 is an elevational view of a discharge means different from that illustrated in FIG. 1.

FIG. 3 illustrates a slightly different means for dislodging the bale from the baling position so that it may be discharged from the rear of the baler. In FIG. 1 the bale is caused to discharge by the action of arm 21 and bar 22 as roller 19 is pivoted as arm 18 is swung downward so that bar 22 tends to pull belt 10 of the baling section towards the rear and thus dislodge the bale and cause it to roll from the rear of the baler. In FIG. 3 the arm 18 has an angular extension 18b extending towards the front of the baler which has a bar or roller 38 at the end opposite its juncture with bar 18. As arm 18 is dropped to a horizontal position, bar 18a, which is approximately an angle of about 120° to arm 18, raises, raising rack 39 which is hinged near the rear of the baler to provide a gangplank for discharging the bale to the rear, causing belt 10 and the bale to move to the rear.

The slight frictional drag between roller 24 and roller 23 causes the belt 10 to slack on the upper side or at the end of the baler when roller 19 is dropped into a position between the base frame members 41. Upon return of roller 19 to the vertical position the slack loop trailing the baler is removed and the baler is again in position to form bales.

Figure 4:
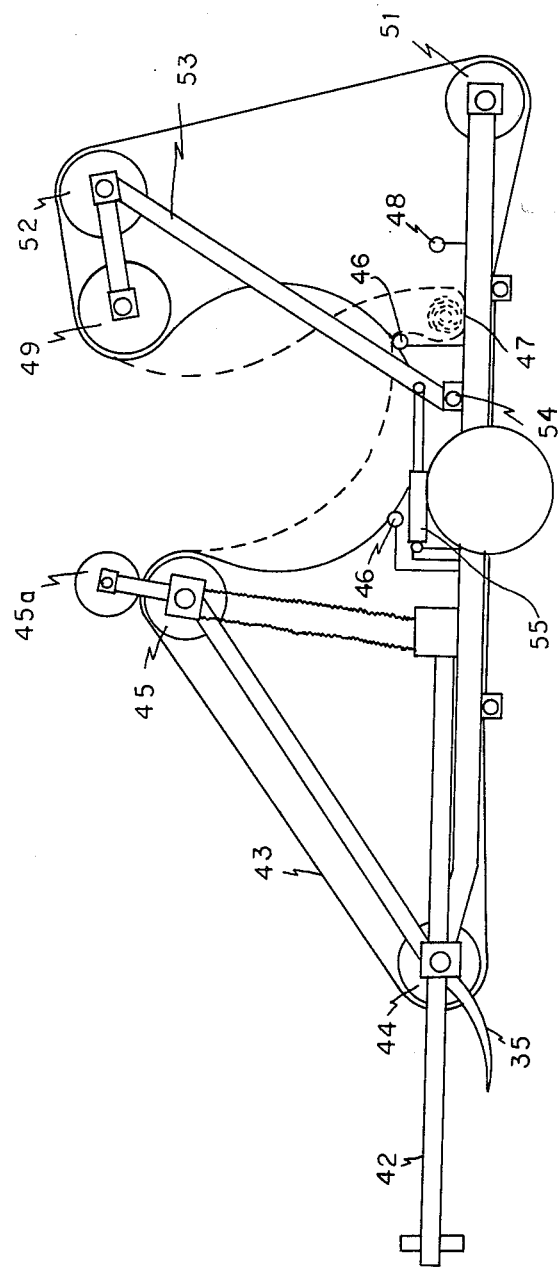
FIG. 4 is an elevational view of a baling section of a single loop baler.

FIG. 4 illustrates a slightly different arrangement of the baling section in a single loop baler. The tines 35 of the fork at the forward portion of the baler perform a similar function to that previously described. The baler is illustrated with a tongue 42 whereby the baler is attached to a suitable tractor. The continuous belt passes around the first forward roller 44 and travels upward over power roller 45. As illustrated in FIG. 4, the belt 43 between roller 44 and 45 has only a slight elevational angle, on the order of about 20° to 35° so that the hay easily travels up the belt without any requirement of an additional feed belt. A friction roller 45a may be required to provide proper traction between rollers 45 and belt 43. At roller 45, the belt drops into the baling section. The belt depends from roller 45 and passes over small rollers 46 to form a small loop (as shown in the phantom lines) wherein a small bale 47 begins to form as the hay is carried into the bight of the loop. A free-hanging loop, although small, is provided after the most rearward roller 46 to provide the positive balling action of a free-hanging loop. After the bale is initiated and grown so that it has a substantial size, e.g., one to two feet in diameter, the balling proceeds more easily. As the bale grows it enlarges the loop so that the bale is supported on rollers 46 during the secondary baling action. Roller 48 is present to assist in providing a support for the bale during discharge. The belt then passes over roller 49 which is above roller 45 and sufficiently to the rear of roller 45 to allow a large bale 50 to form in the baling section. The belt may turn over roller 49 and pass directly to roller 51 or, as illustrated, it may pass over a closely adjacent roller 52 which is slightly to the rear of roller 49 so that the passage of belt 43 between rollers 51 and 52 does not interfere with the baling occurring in the bight or loop formed between rollers 49 and 50. Roller 52 is held in position by arm 53 which is pivoted at its base about pin 54 and is held in an upright position by hydraulic cylinder 55. Arm 53 may be pivoted about point 54 to the lower position shown in the phantom line so that the bale 50 may be discharged from the rear of the baler.

The embodiment illustrated in FIG. 4 is slightly different from that illustrated in FIG. 1. The bales of FIG. 4 provides a shallow angle feed belt and a baling section which is closer to the rear of te baler thus making discharge slightly easier. Also, the bale is supported on rollers after intake of the bale, thus supporting the bale even when belt 43 is slack. The baler of FIG. 4 is more likely to require a friction roll 45a and does not utilize the weight of the bale as effectively to compact the bale as is present in the free-hanging loop of FIG. 1. Bales formed by the baler of FIG. 1 will generally be more dense than bales formed in the baler of FIG. 4.

The balers of this invention are particularly advantageous inasmuch as a single belt is utilized to form a cylindrical, dense bale of hay in a short period of time. A single drive pulley or roller may be utilized and the drive mechanism for same is simplified. The baler does not require any complicated belt tensioning means and the discharge of the bale can be accomplished even if hydraulic power is lost. A gravity feed of these balers tends to automatically compact the hay as it is formed into bales and the depending loop of the belt automatically grows larger as the bale grows larger so that no complicated adjustment means are required to either compact the hay or to adjust belts so that the bale may properly grow.

I claim:

1. A hay baler for forming large cylindrical bales of hay comprising:
   a. frame means for supporting said baler;
   b. means for picking up loose hay from the ground;
   c. endless belt transport means for transporting said loose hay to an elevated position;
   d. a loop of an endless belt in said baling section to receive hay from said elevated position and form cylindrical bales of hay as said belt travels said endless belt being the same endless belt as the belt forming said transport means;
   e. means for propelling said belt; and
   f. discharge means to discharge said bale from the end of said baler opposite said hay pick-up means.

2. The hay baler of claim 1 wherein the endless belt loop of the baling section depends from a pair of spaced elevated rollers.

3. The hay baler of claim 2 wherein the forwardmost elevated roller is a drive roller.

4. The hay baler of claim 2 wherein the rearmost roller is attached to pivot means to move said roller from a first elevated position to a second lower position to the rear of said first position and to lie substantially flat upon said baler frame means.

5. The hay baler of claim 2 wherein said elevated rollers are located substantially in the same plane of elevation.

6. The hay baler of claim 1 wherein a portion of said loop of endless belt rests on small spaced rollers in said hay baling section.

7. The hay baler of claim 1 wherein said loop of endless belt in said hay baling section is in contact with bale compaction means.

8. The hay baler of claim 7 wherein said bale compaction means comprises a pair of movable, opposed rollers in contact with the endless belt to force said belt into a small loop.

* * * * *